United States Patent [19]
Buschini et al.

[11] 3,962,810
[45] June 15, 1976

[54] STOPPER FOR USE IN TRAWLING GEAR

[75] Inventors: Anthony Alan Buschini, Fleetwood; Douglas Edward Swarsbrick, Stourport-on-Severn, both of England

[73] Assignee: Parsons Controls Limited, Stourport-on-Severn, England

[22] Filed: Aug. 19, 1974

[21] Appl. No.: 498,766

[30] Foreign Application Priority Data
Aug. 24, 1973 United Kingdom............ 40207/73

[52] U.S. Cl. .................................................. 43/8
[51] Int. Cl.² .................................. A01K 73/02
[58] Field of Search ............ 43/43.13, 8, 9; 59/86, 59/85, 90

[56] References Cited
UNITED STATES PATENTS

| | | |
|---|---|---|
| 1,222,997 | 4/1917 | Rottmer ............................ 59/86 |
| 1,601,893 | 10/1926 | Vigneron ............................. 43/9 |
| 2,363,668 | 11/1944 | Groen ............................ 43/43.13 |
| 2,369,344 | 2/1945 | Ehmann ............................ 59/86 |
| 2,824,421 | 2/1958 | Nelson ............................ 59/85 |
| 3,319,990 | 5/1967 | Beal ............................ 59/86 |
| 3,656,293 | 4/1972 | Lowery, Sr. ....................... 59/86 |

OTHER PUBLICATIONS
Course for Apprentice Fishermen, World Fishing, Grampian Press Ltd., London, England, 1964, pp. 10, 11.

*Primary Examiner*—Warner H. Camp
*Attorney, Agent, or Firm*—Baldwin, Wight & Brown

[57] ABSTRACT

A stopper component for use in trawling equipment which is made of metal and has one end formed to resemble a chain link, an opposite end in the form of a shackle and a central portion intermediate the two ends provided with outwardly projecting shoulders to prevent the stopper component from being passed through a Kelly's Eye.

5 Claims, 1 Drawing Figure

U.S. Patent June 15, 1976 3,962,810
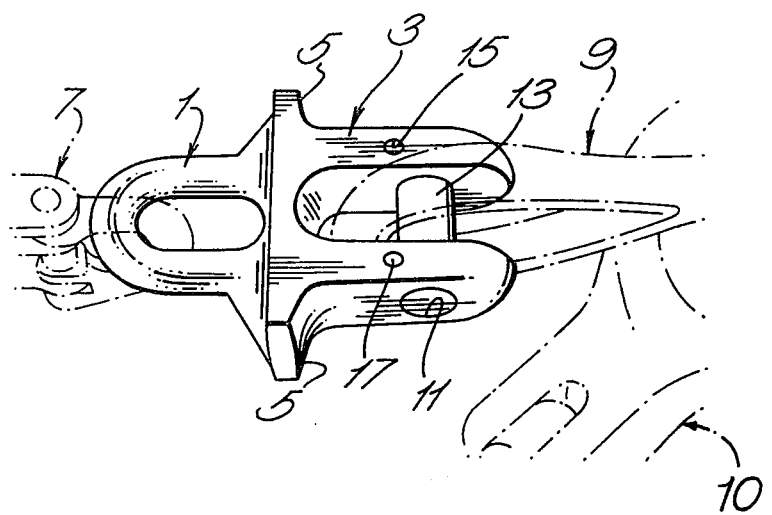

STOPPER FOR USE IN TRAWLING GEAR

This invention relates to a stopper component for use with chain used in a fishing trawl.

In the past, the deep sea trawling industry has had to rely upon mild steel fittings which are of uncertain strength, and wire rope for its trawls. We have now found that by using heat treated alloy steel instead of mild steel, preferably nickel chromium molybdenum alloy steel, and fully heat treating the alloy, a much stronger and more reliable trawl results, and the components can be made extremely wear resistant and have a Brinell hardness in the range of 380 – 410. This wear resistance means that the life expectancy of our components and the chain itself should be of the order of 10:1 compared with components made of conventional mild steel. Furthermore, because of the quality of the steel alloy, it has been possible to design components and chain which, as well as having high strength, are of light weight and are easy to handle. This has the advantage of reducing crew fatigue and in certain instances of reducing manpower.

Traditional stoppers for use with trawling gear are in the form of a double link in the shape of a figure eight with the upper of the two links being considerably larger than the lower one. The disadvantage of such a stopper is that at both ends it has a closed link to which it is normal to connect by means of splicing the trawl wire. This means that once so connected, the trawl wire cannot be replaced without re-splicing. The stopper of the present invention overcomes this disadvantage.

According to the present invention, we provide a metallic stopper component for use in a fishing trawl and having one end formed to resemble a chain link and its opposite end formed to resemble a shackle and wherein a central portion of the component separating the two ends is formed with outwardly projecting shoulders.

Preferably, the end formed to represent a shackle has its two arms formed with oval apertures to receive an oval connecting pin and at least one of the arms is provided with a further aperture at right angles to the oval aperture to receive a locking pin arranged to engage in a tangential groove in the surface of the oval connecting pin.

Preferably, the two projecting shoulders are dimensioned to prevent the stopper passing through a Kelly's Eye which forms one of a range of components for use with the trawling gear for which the component of the present invention is designed. Such a Kelly's Eye is the subject of our co-pending U.S. Pat. application Ser. No. 498,765 filed Aug. 19, 1974.

Preferably, the stopper is manufactured from nickel chromium molybdenum alloy steel having a Brinell hardness in the range of 380 to 410.

Also according to the present invention, we provide trawling gear which incorporates at least one stopper component as hereinbefore described.

One embodiment of stopper in accordance with the present invention is now described with reference to the accompanying drawing which is a perspective view.

Referring to the drawing, the stopper component has one end part 1 of generally ring-like form resembling a conventional chain link and its other end formed to represent a shackle or clevis 3. The width of the clevis 3 is slightly greater than that of the link-like end portion 1 and the web of metal joining the link portion 1 and the clevis end 3 is formed with shoulders 5 which project laterally outwardly beyond the bounds of the clevis 3 and the part 1 a distance sufficient to prevent the stopper from pulling through a Kelly's Eye such as that which is the subject of our aforesaid co-pending U.S. Pat. application Ser. No. 498,765.

As shown in the drawing the ring-like part 1 and the clevis are aligned and are in the same plane.

As can be seen from the drawing the link portion 1 of the stopper is adapted for connection to a length of chain by means of a shackle 7 or other chain component whereas the shackle or clevis end 3 is adapted for connection to a spliced loop 9 of a trawl wire. For this purpose, each of the arms of the shackle end 3 is provided with an oval aperture 11 in which an oval connecting pin 13 is located. Further apertures 15 extend through the arms of the shackle portion 3 at right angles to the oval aperture 11 to receive locking pins 17 which engage in tangential grooves in the surface of the connecting pin 13.

The stopper of the present invention is used in trawling gear at two positions for connecting a length of chain to a length of wire connected to a further length of chain. The length of wire passes through a Kelly's Eye indicated at 10 and is capable of sliding movement relative to the Kelly's Eye. It is desirable to connect the wire to the further length of chain since this is heavier than the wire and tends to keep the trawl on the sea bed where the fish are to be found.

The stopper prevents the wire from pulling through the Kelly's Eye beyond its connection to the first length of chain and at the same time, enables the wire to be reversed between the two lengths of chain when wear begins to occur. Because the wire is joined to the further length of chain, abrasion at this position is at a maximum owing to the function of the chain, and the wire will wear at one end before the other end. In the past, after it has started to wear, it has been necessary with conventional stoppers to replace the wire completely since it has been impossible to reverse it. It has now been found that with the stopper of the present invention, wire life can be doubled merely by reversing the wire.

What is claimed is:

1. A stopper component for use in a fishing trawl, the component including a ring-like part at one end of generally chain link form and two spaced arms at the other end of the component forming a clevis and being joined to said ring-like part, said clevis merging with one end of said ring-like part, and shoulders respectively projecting outwardly from the sides of the component at the location where said clevis joins the ring-like part, said shoulders projecting laterally outwardly beyond said arms and laterally outwardly beyond said ring-like member, said arms being formed with aligned apertures; and a connecting pin extending between said apertures and into said apertures.

2. A component as claimed in claim 1 wherein said apertures are of oval shape and wherein a further aperture is provided in at least one of said arms at right angles to said oval aperture, said connecting pin being of oval shape and having a tangential groove in its surface; and a locking pin in said further aperture and engaging said connecting pin in said tangential groove.

3. A component as claimed in claim 1 wherein the width of the clevis is greater than the width of the ring-like part.

4. Trawling gear incorporating at least one stopper component as claimed in claim 1, a shackle connected to said ring-like part, and a trawl wire loop embracing said connecting pin.

5. A component as claimed in claim 1 in which said ring-like part and said clevis are aligned and are in the same plane.

\* \* \* \* \*